UNITED STATES PATENT OFFICE.

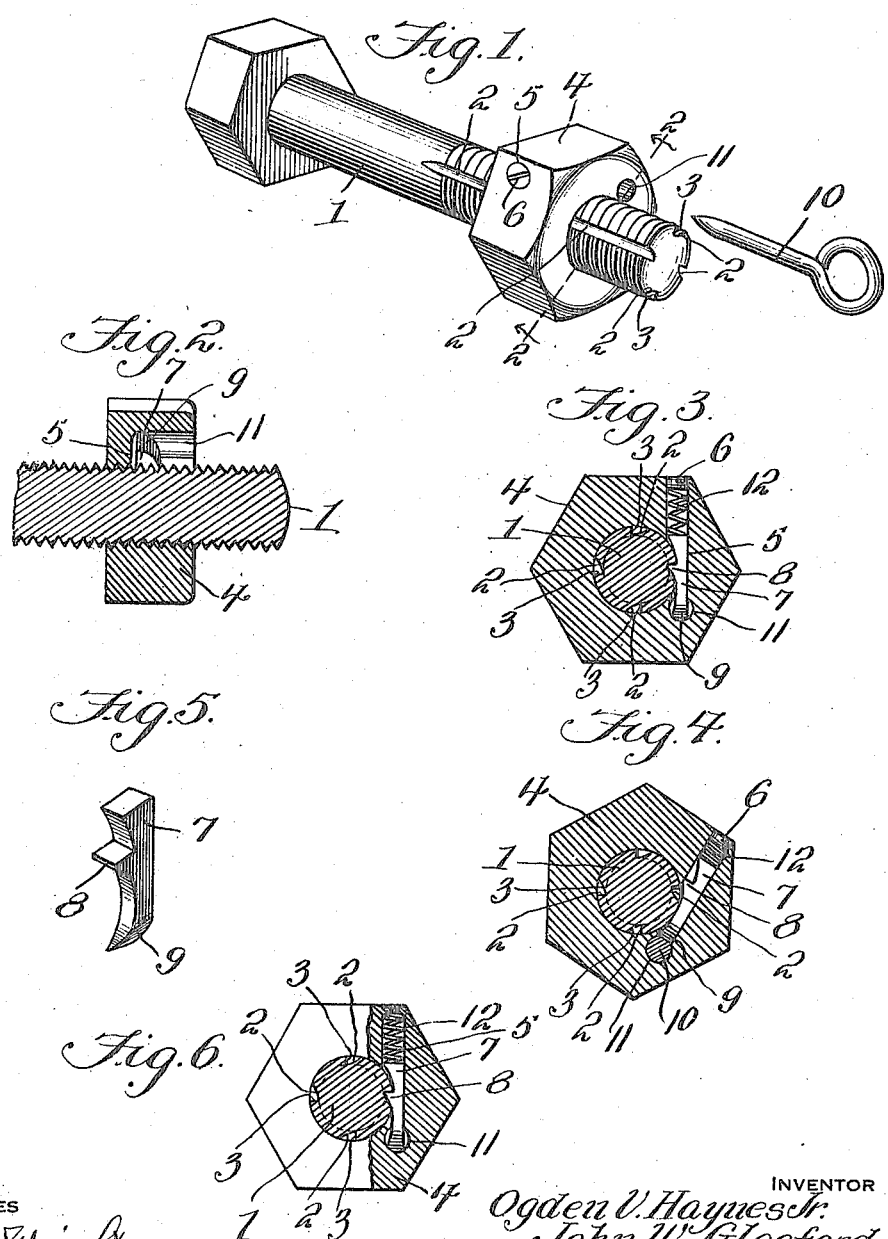

OGDEN V. HAYNES, JR., AND JOHN W. GLASFORD, OF KINGSTON MINES, ILLINOIS.

NUT-LOCK.

1,264,790.   Specification of Letters Patent.   Patented Apr. 30, 1918.

Application filed April 14, 1917. Serial No. 162,167.

*To all whom it may concern:*

Be it known that we, OGDEN V. HAYNES, Jr., and JOHN W. GLASFORD, citizens of the United States, residing at Kingston Mines, in the county of Peoria and State of Illinois, have invented new and useful Improvements in Nut-Locks, of which the following is a specification.

This invention comprehends improvements in nut locks and relates particularly to that type of coupled nut and bolt lock wherein a slidable nut carrying pawl is provided for locking engagement with longitudinal grooves formed in the bolt to hold the nut against rotation in one direction.

One of the objects of the invention is to provide in a nut lock of this type a spring pressed pawl to lockingly engage the bolt and having a beveled inner terminal which may be engaged by a key to release the pawl from locking engagement with the bolt.

Another object of the invention is to provide in a nut lock a tangentially slidable spring pressed pawl or detent which may be held from locking engagement with the bolt by a key and which may be tensioned.

The invention also aims to generally improve devices of this nature to render them more practical, useful and commercially desirable.

With these and other objects in view as will become more apparent as the description proceeds, the invention consists in certain novel features of construction, combination and arrangement of parts as will be hereinafter fully described, illustrated and claimed.

In the drawing,

Figure 1 is a perspective view showing our invention embodied in a coupled nut and bolt.

Fig. 2 is a longitudinal sectional view through the nut and bolt.

Fig. 3 is a transverse sectional view on the plane of line 3—3 of Fig. 1 showing the pawl lockingly engaging the bolt.

Fig. 4 is a view similar to Fig. 3 with the key holding the pawl from engagement with the bolt, and Figs. 5 and 6 are detail views.

Referring in detail to the drawings by numerals, 1 designates a bolt having longitudinal peripheral grooves 2 and radial faces 3.

For coöperation with the grooved bolt, we provide a nut 4 internally threaded to engage the threads on the bolt and formed with a tangential recess 5 which extends beyond the bore of the nut on one side thereof and which communicates with the interior of the nut. This recess is preferably rectangular in cross section for the greater portion of its length but may be circular in cross section and threaded adjacent its outer end to receive a screw plug 6. Instead of the screw plug, a rivet may be used to form a backing for the spring.

A sliding pawl or detent 7 is mounted within the recess and is formed with a tooth 8 on its inner edge by recessing said edge as shown. The inner surface of the pawl, to the opposite sides of the tooth 8, is rounded or concaved from the said pawl, the said concaved surface corresponding to the rounded periphery of the bore of the nut or of the shank of the bolt, so that only the tooth 8 of the pawl enters the bore of the nut and also so that the concaved surface opposite the pawl contacts with the threads of the bolt, as clearly shown by the drawings. The inner end of the pawl or detent is beveled to provide a key engaging face 9 which may be engaged by a key 10 inserted through an opening 11 in the outer face of the nut. The pawl engaging end of the key is tapered to conical formation and the key opening is so located that when the key is forced thereinto, into engagement with the beveled face of the pawl, it will force said pawl outwardly a slight distance.

The helical expansive spring 12 is positioned within the outer end of the recess 5 to force the pawl inwardly and hold its tooth 8 in position to lockingly engage in the grooves 2 of the bolt.

In assembling the device, the pawl is first slipped into its recess then the spring is inserted and finally the plug 6 is screwed into position to retain the spring. The nut may now be threaded on the bolt without lockingly engaging the grooves 2 thereof, but the faces 3 of said grooves will by catching on the tooth 8 hold the nut from reverse rotation, such as would disconnect it from the bolt. The contacting engagement of the bolt with the inner face of the pawl will cause the said pawl to be moved longitudinally against the pressure of the spring 12, to approximately the position illustrated in Fig. 4. When the nut is screwed entirely home upon the bolt, the same is given a slight turn in an unscrewing direction, the said turn being less than a quarter of a revolution, but being sufficient to permit one of the straight surfaces provided by one of the grooves 2 in the bolt to contact with the straight upper face or shoulder of the tooth 8 to assist the spring 12 in bringing the said pawl into contacting engagement with the lower wall of the recess 5, and to the position illustrated in Figs. 3 and 6 of the drawings. The spring 12 is of sufficient strength to maintain the pawl in this position against any ordinary stress or strain to which either the bolt or nut is subjected, and when the nut is to be unscrewed from the bolt, the nut is given a slight turn in a homeward screwing direction so that the frictional contact of the nut with the lower concaved inner face of the pawl, or more strictly speaking, the contacting engagement of the angular wall of the groove with which the tooth of the pawl engages with the lower or angular surface of the said tooth, will raise the pawl against the pressure of the spring 12, and thereafter, by inserting the key 10 through the opening 11, the said key will further force the pawl in the direction of the spring and to the position illustrated in Fig. 4 of the drawings, permitting the nut to be then freely unscrewed from the bolt.

What we claim is:—

1. In combination with a bolt having longitudinal grooves defining an angular wall and a straight shoulder, and a nut screwed upon said bolt, said nut having a tangential recess communicating with the bore of the nut, a pawl slidable in said recess and designed to be limited in its said sliding movement by contacting with the end wall of the said recess, said pawl, upon its inner face having an approximately centrally arranged tooth and the said inner face of the said pawl to the opposite sides of the tooth being concaved, whereby to agree with the peripheral contour of the shank of the bolt and to contact with said shank, and further whereby said tooth of the pawl may be projected into the bore of the nut, a spring in the recess contacting with the pawl to influence the movement of the same in one direction, and closing means for the recess providing a contacting element for the spring.

2. In combination with a bolt having its shank grooved longitudinally, and the said grooves defining each an angular wall and a straight shoulder, a nut designed to be screwed on the bolt, said nut having a tangential recess communicating with the bore of the nut, and which recess has its walls, opposite the bore of the nut arranged at a right angle with respect to each other, said nut having an opening entering from its outer face and communicating with the end of the recess, a substantially rectangular pawl slidable in said recess and having one of its ends beveled, said pawl, upon the inner face thereof having an approximately centrally arranged tooth and the said inner face of the pawl to the opposite sides of the said tooth being concaved whereby only the tooth of the pawl is projected in the bore of the nut and also whereby the said concaved surface of the pawl will be frictionally contacted by the bolt, when the tooth engages in one of the grooves of the bolt and when the bolt is turned, and also by virtue of such turning of the bolt to move the pawl in one direction, spring means in the recess for moving the pawl in an opposite direction, and a closure for the recess providing an abutment for said spring means.

In testimony whereof we affix our signatures.

OGDEN V. HAYNES, Jr.
JOHN W. GLASFORD.

Copies of this patent may be obtained for five cents each, by addressing the "Commissioner of Patents, Washington, D. C."